US009524172B2

(12) United States Patent
Krishnamoorthy et al.

(10) Patent No.: US 9,524,172 B2
(45) Date of Patent: Dec. 20, 2016

(54) FAST START

(71) Applicant: Bank of America Corporation, Charlotte, NC (US)

(72) Inventors: Sundar Krishnamoorthy, East Windsor Township, NJ (US); Suresh G. Nair, Robbinsville Township, NJ (US); Mohana K. Viswanathan, Princeton, NJ (US)

(73) Assignee: Bank of America Corporation, Charlotte, NC (US)

( * ) Notice: Subject to any disclaimer, the term of this patent is extended or adjusted under 35 U.S.C. 154(b) by 158 days.

(21) Appl. No.: 14/500,495

(22) Filed: Sep. 29, 2014

(65) Prior Publication Data

US 2016/0092242 A1    Mar. 31, 2016

(51) Int. Cl.
| | | |
|---|---|---|
| *G06F 15/177* | (2006.01) | |
| *G06F 9/00* | (2006.01) | |
| *G06F 1/24* | (2006.01) | |
| *G06F 7/04* | (2006.01) | |
| *G06F 12/14* | (2006.01) | |
| *G06F 9/44* | (2006.01) | |
| *G06F 21/31* | (2013.01) | |
| *G06F 21/55* | (2013.01) | |
| *G06F 9/445* | (2006.01) | |
| *G06F 21/00* | (2013.01) | |

(52) U.S. Cl.
CPC ............. *G06F 9/4401* (2013.01); *G06F 21/31* (2013.01); *G06F 21/552* (2013.01); *G06F 1/24* (2013.01); *G06F 9/445* (2013.01); *G06F 9/4416* (2013.01); *G06F 21/00* (2013.01); *G06F 21/316* (2013.01)

(58) Field of Classification Search
CPC ...... G06F 21/31; G06F 9/4401; G06F 21/316; G06F 1/24; G06F 9/445; G06F 9/4416; G06F 21/00
USPC ........................ 713/1, 2, 100; 726/18, 19, 28
See application file for complete search history.

(56) References Cited

U.S. PATENT DOCUMENTS

| | | | | |
|---|---|---|---|---|
| 8,176,314 | B2 * | 5/2012 | Bostick | G06F 9/44505 713/1 |
| 8,533,700 | B1 * | 9/2013 | Feeser | G06F 8/60 717/168 |
| 2004/0111620 | A1 * | 6/2004 | Saunders | G06F 21/10 713/182 |
| 2005/0204198 | A1 * | 9/2005 | Pagan | G06F 9/445 714/36 |
| 2006/0031289 | A1 * | 2/2006 | Experton | G06F 9/4843 709/204 |

(Continued)

*Primary Examiner* — Ji H Bae
(74) *Attorney, Agent, or Firm* — Banner & Witcoff, Ltd.; Michael A. Springs

(57) ABSTRACT

Aspects of the disclosure relate to methods, systems, and apparatuses of a fast start system. A computing device may automatically restart itself based on a restart schedule from a fast start network server. The computing device may initiate a booting sequence and retrieve login credentials of a user stored in the computing device. Using the stored login credentials, the computing device can login the user to the system. In response to successfully logging in the user, the computing device may initialize at least one startup application on the computing device. Once the user is successfully logged in, the computing device may automatically lock the computing device to the user to prevent any unauthorized use of the workstation.

20 Claims, 8 Drawing Sheets

(56) References Cited

U.S. PATENT DOCUMENTS

| | | | |
|---|---|---|---|
| 2010/0192151 A1* | 7/2010 | Chen | G06F 11/3476 718/102 |
| 2011/0004879 A1* | 1/2011 | Olson | G06F 9/4401 718/102 |
| 2012/0244839 A1* | 9/2012 | Shen | H04L 63/083 455/411 |
| 2012/0284297 A1* | 11/2012 | Aguera-Arcas | G06F 21/629 707/769 |
| 2016/0027124 A1* | 1/2016 | Rojas | G06Q 30/06 705/30 |

* cited by examiner

List of Workstations

| User Name | Machine Name | IP Address | Status | Group | Enabled | Last Updated |
|---|---|---|---|---|---|---|
| user1 | machine1 | 192.168.0.100 | Success | Global | X | 7/23/2014 16:58 |
| user2 | machine2 | 192.168.0.101 | Failure | Global | | 7/23/2014 17:58 |
| user3 | machine3 | 192.168.0.102 | Success | Global | X | 7/23/2014 17:05 |
| user4 | machine4 | 192.168.0.103 | Success | Global | X | 7/23/2014 18:12 |
| user5 | machine5 | 192.168.0.104 | Success | Global | | 7/23/2014 13:33 |

FIG. 6

FAST START

BACKGROUND

In some scenarios such as workplaces, users may log off and/or shutdown the users' computers at the end of each workday and startup and login to the computer at the beginning of their workdays. The computers may login to a workplace network to access resources available on the workplace network. Users however may be arriving at around the same time each morning to begin their workday resulting in congestion on the network and slow login times as thousands of users login to their computers and the workplace network within a small time window. Such delays caused by slow login times can have a negative impact on the user's productivity since the users must wait for the computers to startup and load applications before the user can begin working.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure relate to methods, systems, and apparatuses of the fast start system. A computing device may automatically restart itself based on a restart schedule from a fast start network server. The computing device may initiate a booting sequence and retrieve login credentials of a user stored in the computing device. Using the stored login credentials, the computing device can login the user to the system. In response to successfully logging in the user, the computing device may initialize at least one startup application on the computing device. Once the user is successfully logged in, the computing device may automatically lock the computing device to the user to prevent any unauthorized use of the workstation.

In some aspects, the computing device may provide regular reports on the status and progress of the fast start process. The reports may indicate whether the any errors have occurred during the fast start process and confirm the successful completion of steps in the fast start process. The reports may be transmitted to the fast start network server and stored in a database in the network. An administrator may access the system to view the overall status of the system based on data stored in the database and configure settings for the computing devices using the fast start system.

Of course, the methods and systems of the above-referenced embodiments may also include other additional elements, steps, computer-executable instructions, or computer-readable data structures. In this regard, other embodiments are disclosed and claimed herein as well. The details of these and other embodiments of the present invention are set forth in the accompanying drawings and the description below. Other features and advantages of the invention will be apparent from the description, drawings, and claims.

BRIEF DESCRIPTION OF THE DRAWINGS

The present disclosure is illustrated by way of example and not limited in the accompanying figures in which like reference numerals indicate similar elements and in which:

FIG. 6 shows an illustrative administrator interface according to one or more aspects described herein.

DETAILED DESCRIPTION

In the following description of various illustrative embodiments, reference is made to the accompanying drawings, which form a part hereof, and in which is shown, by way of illustration, various embodiments in which the claimed subject matter may be practiced. It is to be understood that other embodiments may be utilized, and that structural and functional modifications may be made, without departing from the scope of the present claimed subject matter.

It is noted that various connections between elements are discussed in the following description. It is noted that these connections are general and, unless specified otherwise, may be direct or indirect, wired or wireless, and that the specification is not intended to be limiting in this respect.

As will be discussed further below, aspects described herein relate to alleviating the problem of congestion on the network and slow computer startup times as a result of many users logging in around the same time. Aspects described herein may include utilizing non-work hours to schedule workstation restarts and to restart workstations as well automatically logging in users and pre-loading applications. The result is that when the user arrives in the morning the computer may be in a locked state with all specified applications already initialized. The user need only login to unlock the workstation to begin working.

Figure 1:
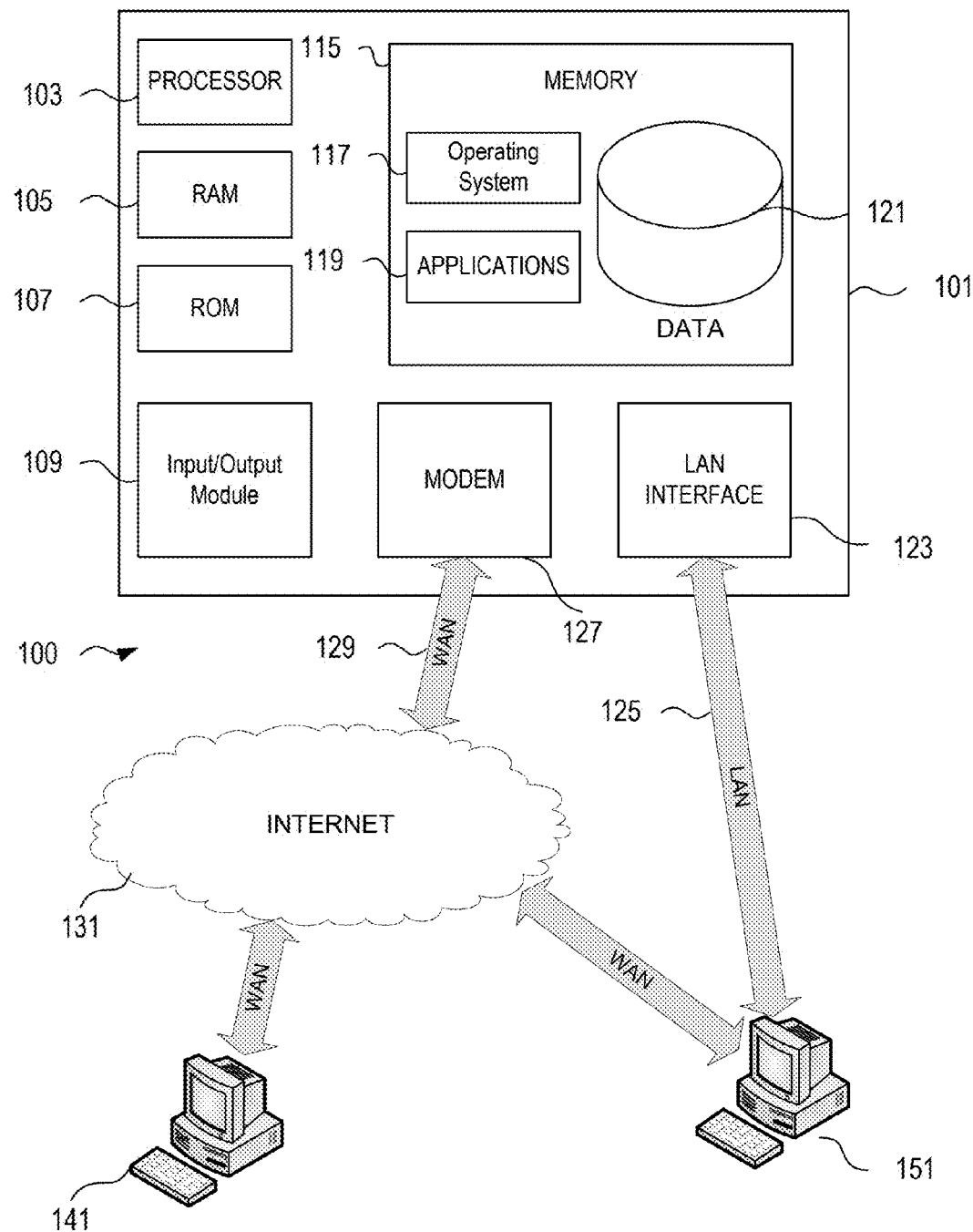
FIG. 1 illustrates an example operating environment in which various aspects of the disclosure may be implemented.

FIG. 1 depicts an illustrative operating environment in which various aspects of the present disclosure may be implemented in accordance with one or more example embodiments. Referring to FIG. 1, computing system environment 100 may be used according to one or more illustrative embodiments. Computing system environment 100 is only one example of a suitable computing environment and is not intended to suggest any limitation as to the scope of use or functionality contained in the disclosure. Computing system environment 100 should not be interpreted as having any dependency or requirement relating to any one or combination of components shown in illustrative computing system environment 100.

Computing system environment 100 may include computing device 101 having processor 103 for controlling overall operation of computing device 101 and its associated components, including random-access memory (RAM) 105, read-only memory (ROM) 107, communications module 109, and memory 115. Computing device 101 may include a variety of computer readable media. Computer readable media may be any available media that may be accessed by computing device 101, may be non-transitory, and may include volatile and nonvolatile, removable and non-removable media implemented in any method or technology for storage of information such as computer-readable instructions, object code, data structures, program modules, or other data. Examples of computer readable media may include random access memory (RAM), read only memory (ROM), electronically erasable programmable read only memory (EEPROM), flash memory or other memory technology, compact disk read-only memory (CD-ROM), digital versatile disks (DVD) or other optical disk storage, magnetic cassettes, magnetic tape, magnetic disk storage or other magnetic storage devices, or any other medium that can be used to store the desired information and that can be accessed by computing device 101.

Although not required, various aspects described herein may be embodied as a method, a data processing system, or as a computer-readable medium storing computer-executable instructions. For example, a computer-readable medium storing instructions to cause a processor to perform steps of a method in accordance with aspects of the disclosed arrangements is contemplated. For example, aspects of the method steps disclosed herein may be executed on a processor on computing device 101. Such a processor may execute computer-executable instructions stored on a computer-readable medium.

Software may be stored within memory 115 and/or storage to provide instructions to processor 103 for enabling computing device 101 to perform various functions. For example, memory 115 may store software used by computing device 101, such as operating system 117, application programs 119, and associated database 121. Also, some or all of the computer executable instructions for computing device 101 may be embodied in hardware or firmware. Although not shown, RAM 105 may include one or more applications representing the application data stored in RAM 105 while computing device 101 is on and corresponding software applications (e.g., software tasks), are running on computing device 101.

Communications module 109 may include a microphone, keypad, touch screen, and/or stylus through which a user of computing device 101 may provide input, and may also include one or more of a speaker for providing audio output and a video display device for providing textual, audiovisual and/or graphical output. Computing system environment 100 may also include optical scanners (not shown). Exemplary usages include scanning and converting paper documents, e.g., correspondence, receipts, and the like, to digital files.

Computing device 101 may operate in a networked environment supporting connections to one or more remote computing devices, such as computing devices 141 and 151. Computing devices 141 and 151 may be personal computing devices or servers that include any or all of the elements described above relative to computing device 101. Computing devices 141 or 151 may be a mobile device (e.g., smart phone) communicating over a wireless carrier channel.

The network connections depicted in FIG. 1 may include local area network (LAN) 125 and wide area network (WAN) 129, as well as other networks. When used in a LAN networking environment, computing device 101 may be connected to LAN 125 through a network interface or adapter in communications module 109. When used in a WAN networking environment, computing device 101 may include a modem in communications module 109 or other means for establishing communications over WAN 129, such as Internet 131 or other type of computer network. The network connections shown are illustrative and other means of establishing a communications link between the computing devices may be used. Various well-known protocols such as transmission control protocol/Internet protocol (TCP/IP), Ethernet, file transfer protocol (FTP), hypertext transfer protocol (HTTP) and the like may be used, and the system can be operated in a client-server configuration to permit a user to retrieve web pages from a web-based server. Any of various conventional web browsers can be used to display and manipulate data on web pages.

The disclosure is operational with numerous other general purpose or special purpose computing system environments or configurations. Examples of well-known computing systems, environments, and/or configurations that may be suitable for use with the disclosed embodiments include, but are not limited to, personal computers (PCs), server computers, hand-held or laptop devices, smart phones, multiprocessor systems, microprocessor-based systems, set top boxes, programmable consumer electronics, network PCs, minicomputers, mainframe computers, distributed computing environments that include any of the above systems or devices, and the like.

Figure 2:
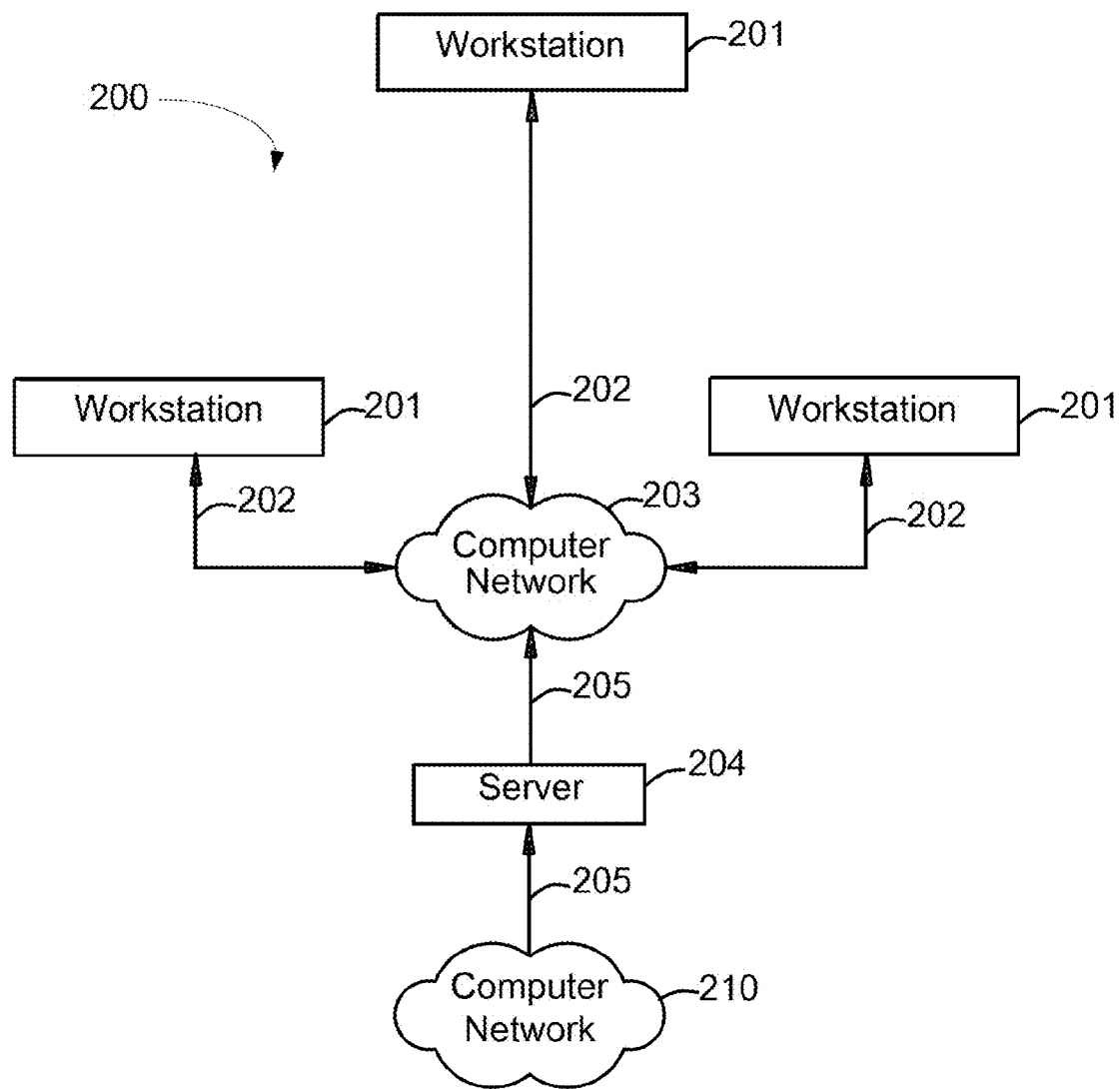
FIG. 2 is an illustrative block diagram of workstations and servers that may be used to implement the processes and functions of certain aspects of the present disclosure according to one or more aspects described herein.

FIG. 2 depicts an illustrative block diagram of workstations and servers that may be used to implement the processes and functions of certain aspects of the present disclosure in accordance with one or more example embodiments. Referring to FIG. 2, illustrative system 200 may be used for implementing example embodiments according to the present disclosure. As illustrated, system 200 may include one or more workstation computers 201. Workstation 201 may be, for example, a desktop computer, a smartphone, a wireless device, a tablet computer, a laptop computer, and the like. Workstations 201 may be local or remote, and may be connected by one of communications links 202 to computer network 203 that is linked via communications link 205 to server 204. In system 200, server 204 may be any suitable server, processor, computer, or data processing device, or combination of the same. Server 204 may be used to process the instructions received from, and the transactions entered into by, one or more participants.

Computer network 203 may be any suitable computer network including the Internet, an intranet, a wide-area network (WAN), a local-area network (LAN), a wireless network, a digital subscriber line (DSL) network, a frame relay network, an asynchronous transfer mode (ATM) network, a virtual private network (VPN), or any combination of any of the same. Communications links 202 and 205 may be any communications links suitable for communicating between workstations 201 and server 204 (e.g. network control center), such as network links, dial-up links, wireless links, hard-wired links, as well as network types developed in the future, and the like. A virtual machine may be a software implementation of a computer that executes computer programs as if it were a standalone physical machine.

Figure 3:
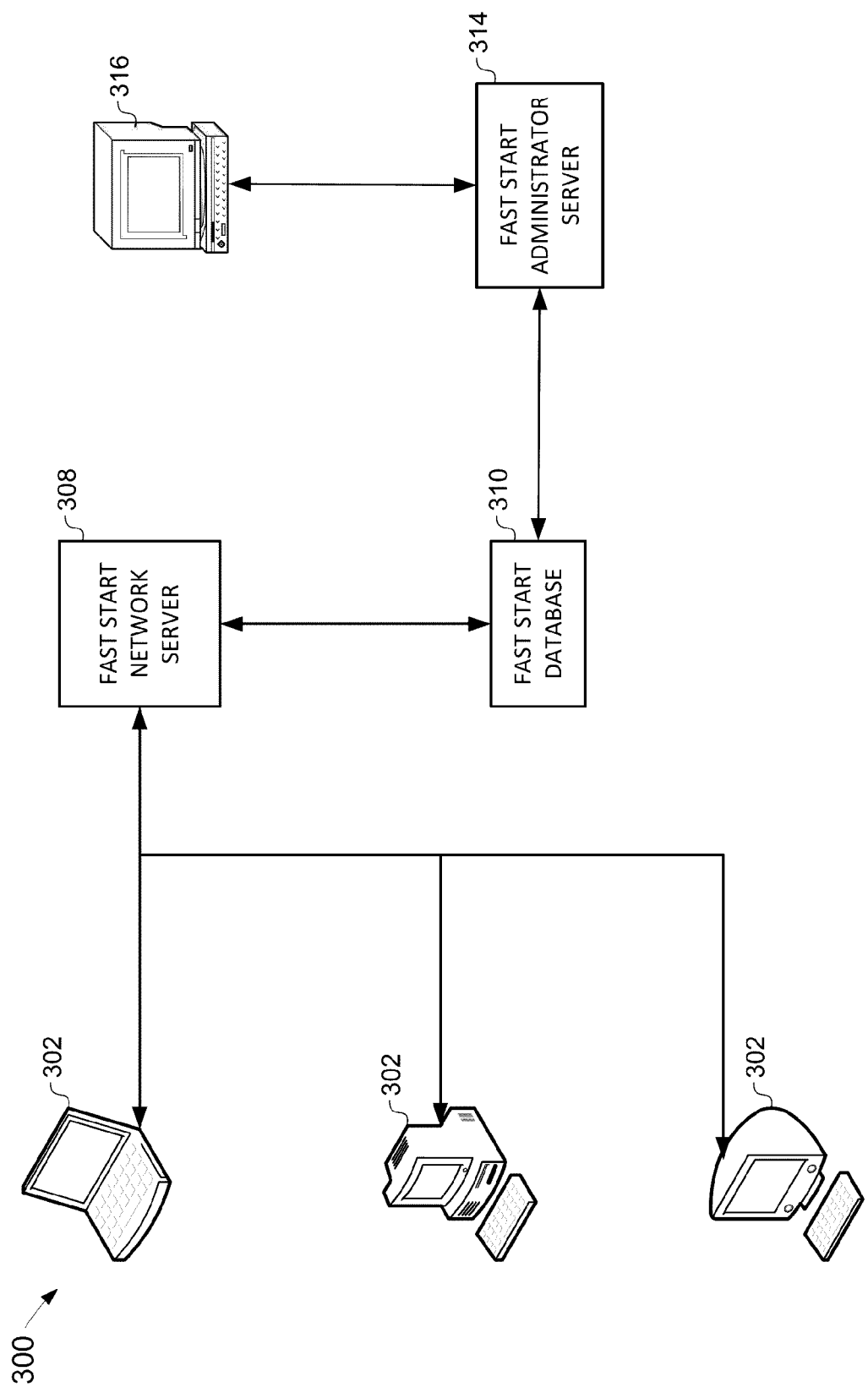
FIG. 3 is an illustrative diagram of the fast start system according to one or more aspects described herein.

FIG. 3 illustrates an example fast start system 300 including multiple workstations 302, a fast start network server 308, a fast start database 310, a fast start administrator server 314, and administrator 316. The fast start system 300 can control and dictate when the workstations 302 are restarted and provide system administrators with information about statuses of workstations in the fast start system 300. The workstations 302 may have a fast start system component such as a fast start application executing or running on the workstations 302. The fast start application can cause the workstation 302 to restart or shutdown, automatically login a user, synchronize user passwords, initialize startup applications on the workstation, and report on the status and/or startup progress of the workstation 302. The fast start application may cause a workstation 302 to restart or reboot according to a schedule. The schedule may be provided by the fast start network server 308 and configured by network administrator 316 via fast start administrator server 314.

A user of the workstation can setup and enable fast start of the workstation using the fast start application. The fast start application can prompt the user to enter the user's user name and corresponding password and/or capture the user's user name and password when the user enters the information to log into the workstation. The user's login credentials (e.g., user name and password) may be stored as a locally as a secret in the workstation. For example, the user name and password may be stored as a local security authority (LSA) or as a Network Provider in a workstation having a Microsoft Windows operating system.

Each time a user logs into the workstation the fast start application can check whether the user has enabled fast start on the workstation and provided login credentials. If the user has not enabled fast start, the fast start component may prompt or provide the user with the option to enable fast start with the user's login.

In some security schemes, the user's password may expire after a certain time period (e.g., 3 months, 6 months), and the user may be required to provide a new password. The fast start application may remind the user each day about the password expiration. If the user has not changed the password by the expiration date, the fast start application may force the user to change the password. Any time the user changes his password on the workstation, the fast start application may update the stored password using the password entered during the password change.

In addition to automatically logging in the user, the fast start application can handle legal notices that a user may be required to acknowledge before logging in to a workstation. During automatic logon, the fast start application may detect that a legal notice is present and initiate a command to automatically acknowledge the legal notice prior to automatically logging in the user. After fast start is completed and the workstation is locked to the logged in user, the fast start application may track whether the user has manually logged in or unlocked the computer each day. For the first time that a user unlocks or manually logs in each day, the fast start application may display the legal notice and require the user to indicate acknowledgment of the legal notice before allowing the user to login.

In some aspects, restarting of the workstation may not be required each day. The workstation might only be restarted after new software or updates are deployed to the workstation. In some aspects, the workstation may be restarted, for example, weekly or monthly, etc.

The fast start network server 308 may interact with the fast start application on the workstation and register and/or unregister a workstation from the fast start system 300. The fast start network server 308 may receive reports from the workstations 302 regarding the progress of the fast start startup process on the workstations 302 and the status of the workstations 302. The fast start network server 308 may retrieve the restart schedule for the workstations 302 in the network from a fast start database 310 in response to a request from the fast start applications on the workstations 302.

The fast start network server 308 can handle the maintenance process as well. A restart of a workstation may occur after updating or patching software on the workstation, and the restart may occur before the scheduled restart for the workstation. The fast start network server 308 may determine that a restart has been performed as a result of updating software on the workstation and may reschedule a fast start restart of the workstation in the remaining portion of the reboot schedule for the day. For example, if the restart resulting from updating software occurred at 4:30 am, the fast start network server 308 may change the restart schedule of the particular workstation from 4:35 am to 5 am of the same day.

The fast start network server 308 may push updates to the workstations and cause the installation of the updates and subsequent fast start restarts of the workstations. These updates may occur on non-workdays (e.g., weekends) so that the update process and any errors which may result from updating the software may be discovered on a non-workday.

The fast start database 310 can store data and information related to and for the fast start system. For example, the fast start database 310 can store status information of all of the workstations in the system, configuration data for all of the workstations, message logs of messages received by the fast start network server 308 from the workstations, the reboot schedule, and registration status of the workstations (e.g., registered workstations, unregistered workstations). The fast start database 310 can communicate with the fast start administrator server 314 to provide data to use in generating reports.

The fast start administrator server 314 can provide a console or interface for a network or system administrator 316 to control configuration of the workstations and to obtain various reports on the status of the network or system and the workstations. For example, the fast start administrator server 314 can generate a health map to indicate locations of the workstations and statuses of the workstations from data stored in fast start database 310. The health map provides the admin or administrator 316 with the ability to easily determine whether large areas of the network are problematic and identify and pinpoint problem locations. The fast start administrator server 314 may be used to schedule workstation maintenance and configure the fast start system.

Figure 4A:
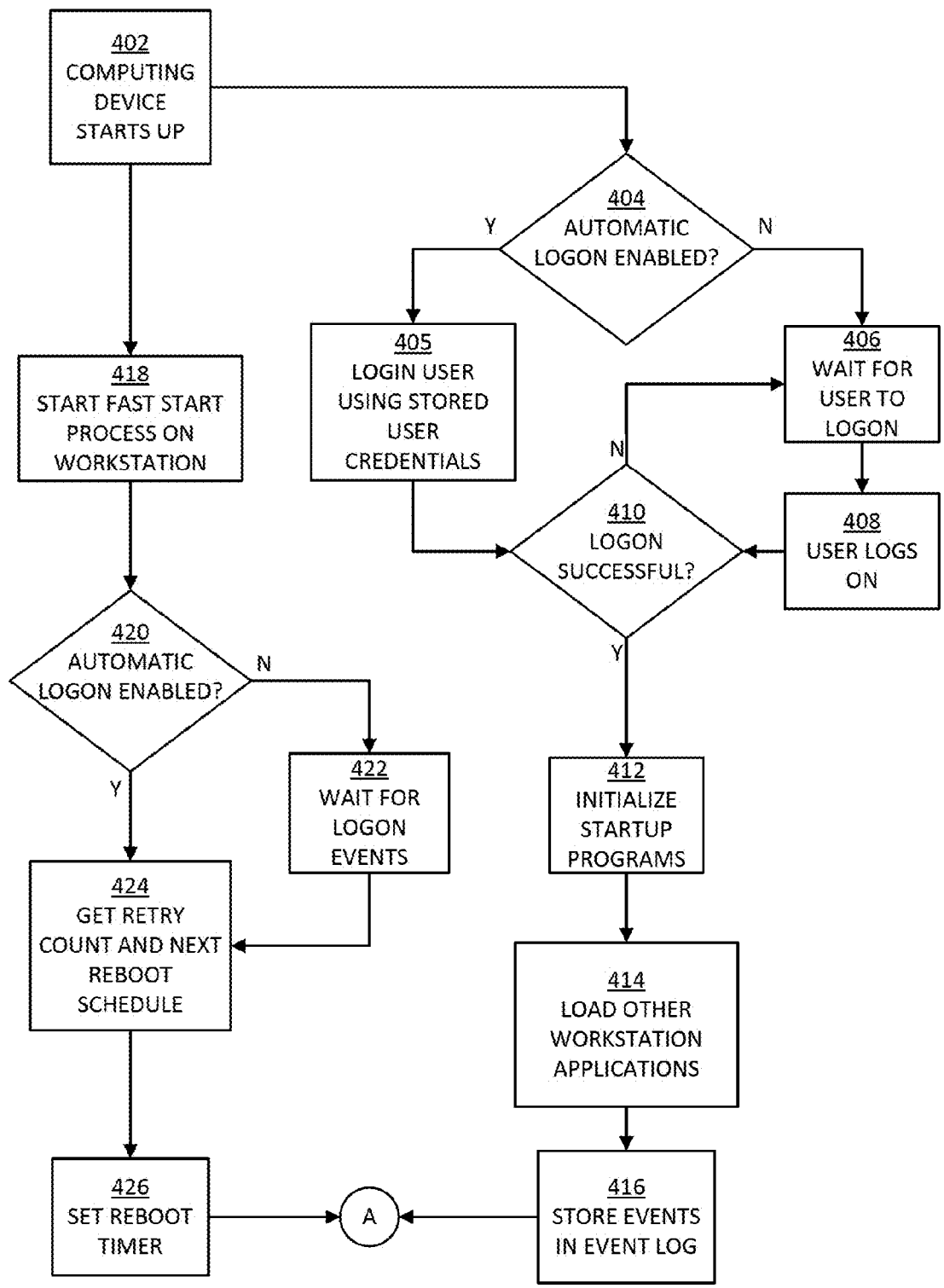
FIGS. 4A and 4B show an illustrative fast start method according to one or more aspects described herein.
Figure 4B:
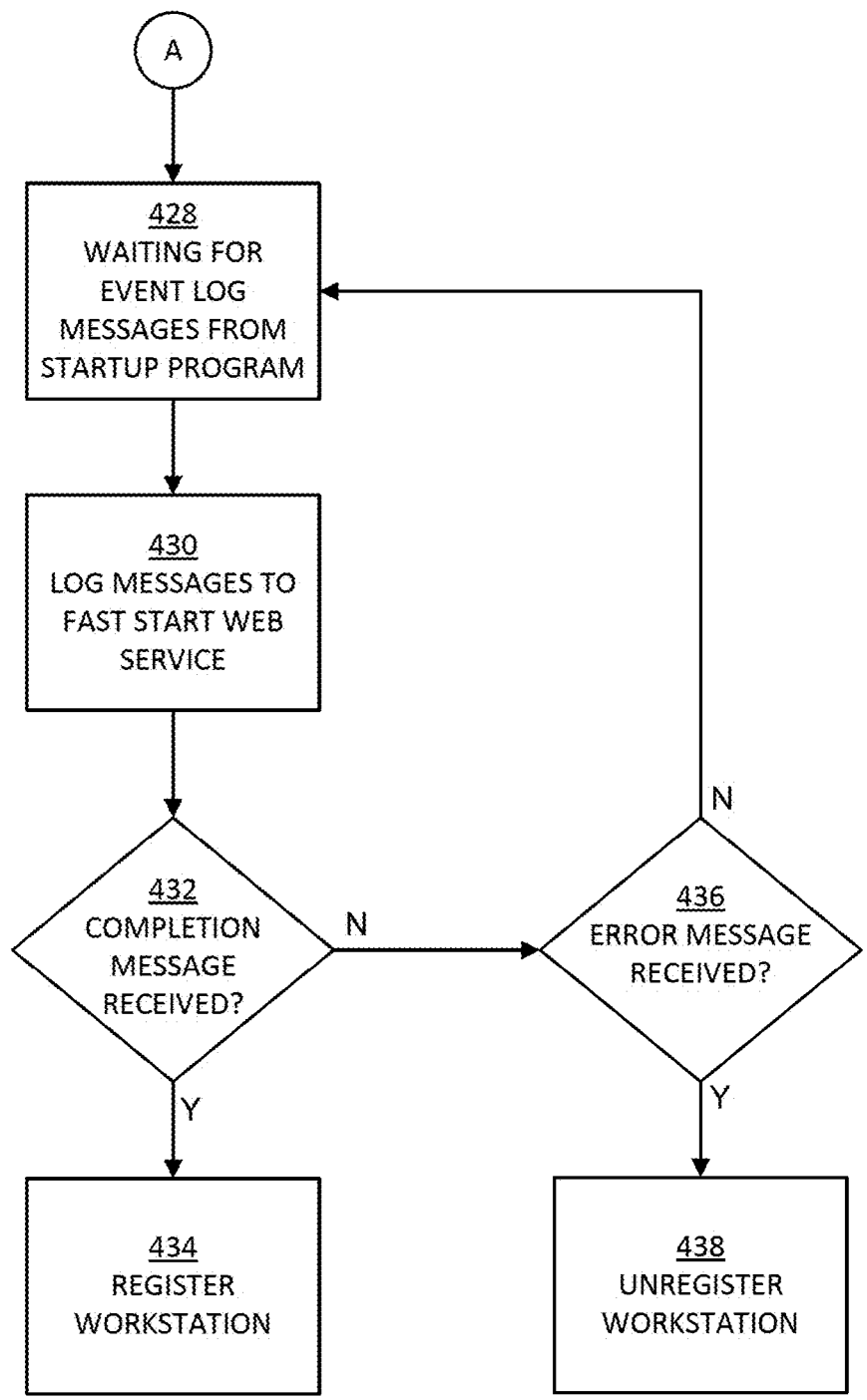

FIGS. 4A-4B illustrate an example of a fast start pre-load or start up process. Steps 402-426 are shown in FIG. 4A, and the fast start start up process is continued in FIG. 4B with step 428. At step 402, the computing device starts or boots up following a restart or reboot according to a restart schedule. The restart schedule may assign restart times for workstations according to the branch offices at which the workstations are located. The restart times may be at a particular time or within a time frame. In general, the restart times may be between 3 am to 6 am in the local time zone of the branch office. The fast start application may have a randomization aspect and add or subtract a randomly sized time interval to the assigned time so that not all workstations at the branch office are restarting at the same time to reduce the load on the login servers. In the event the workstation is unable to shutdown and reboot or restart normally, the fast start application may force the workstation to shutdown and reboot or restart. For example, the workstation may be unable to normally shutdown and restart due to being unable to end processes on the workstation. In this instance, the fast start application may command the operating system to forcefully end all processes and shutdown or restart. The forced shutdown may be in response to expiration of a reboot timer.

After the device starts up in step 402, two branches of processes may occur concurrently or sequentially beginning with step 404 or 418. At step 404, the workstation (e.g., operating system of the workstation) may determine whether automatic logon is enabled by a user or primary user of the workstation. If automatic logon is enabled, the workstation may retrieve credentials from a secure memory and use the credentials of the user to log the user into the workstation at step 405. For example, the workstation can transmit the stored user name and password to a login server. If automatic logon is not enabled, the system may wait for the user to logon at step 406. At step 408, the user can logon. At step 410, the workstation may determine whether the logon using the stored user credentials or the information provided by the user was successful 410. For example, the workstation may wait for a message from the login server that the user's credentials are authentic and/or the user is an authorized user. In the event that the user is not successfully logged on, the workstation may return to step 406 and wait for the user to enter logon credentials.

If the logon is determined to be successful at step 410, the workstation may initialize startup programs on the workstation at step 412. The startup programs may be specified or configured by the administrator and may include applications used daily by the user. The startup programs may be one or more programs that are more complicated or take longer or more computing resources to load. The fast start application may initialize the startup applications individually before other programs are initialized. Once the startup programs have finished loading or initializing, the workstation may load other workstation applications at step 414. At step 416, the workstation may store startup events in the event log and proceed to step 428.

At step 418, the fast start application process starts on the workstation. At step 420, the workstation determines whether automatic logon is enabled. If automatic logon is not enabled, the process may proceed to step 422 to wait for logon events such as steps 406-410 which include providing the user with an option to enable automatic logon, waiting for the user to enter login credentials and determining whether the user's entered login credentials are authentic. After a successful logon occurs, the workstation may proceed to obtaining a retry count and the time of the next reboot at step 424. The time of the next reboot may be the scheduled reboot time for the next day or workday. The retry count is the time period after which the workstation should attempt to reboot should the previous reboot fail. For example, the workstation may wait 30 minutes before restarting the workstation in case an error or other issue occurs during startup which prevents the workstation from properly initializing or starting the applications. At step 426, the workstation may set the reboot timer for the retry count and proceed to 428.

Turning to FIG. 4B, at step 428, the workstation may watch for event log messages from the startup program. The event messages may be stored in the workstation and transmitted to the fast start web server at step 430. At step 432, the workstation waits for a completion message. At step 434, the workstation is registered with the fast start web server in response to receiving a completion message or the registration of the workstation is maintained if the workstation is already registered. In response to the completion message, the fast start application may terminate the reboot timer to prevent unwanted automatic restart of the workstation. If at step 432, a completion message is not received, the system determines whether an error message has been received at step 436. If an error message is received, the workstation is unregistered from the fast start system at step 438. If no error message is received at step 436, the workstation returns to watching for event log messages from the startup program at step 428.

Figure 5:
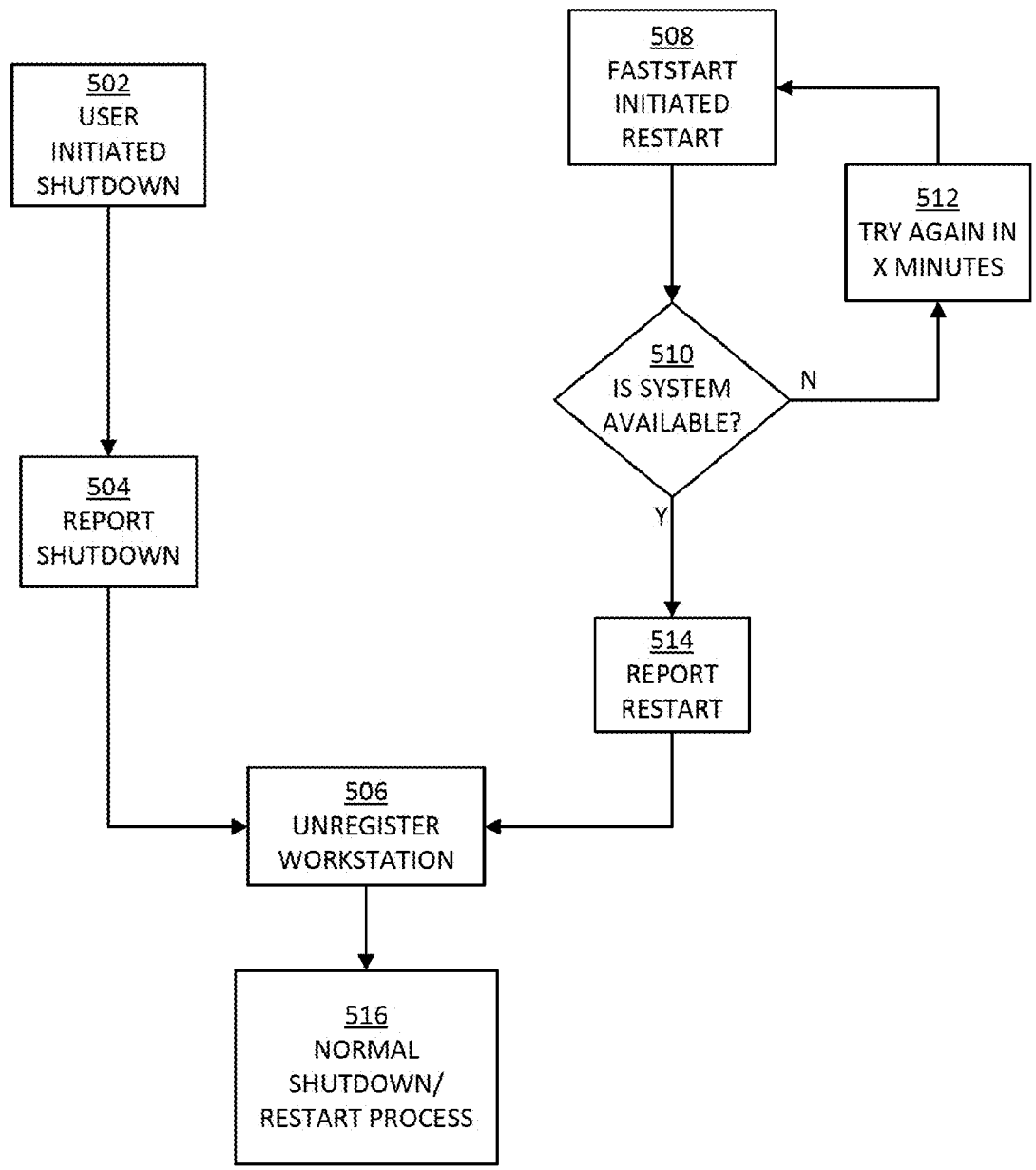
FIG. 5 shows an illustrative workstation unregistration according to one or more aspects described herein.

FIG. 5 illustrates an example of a fast start unregistration process. There may be two ways to initiate a shutdown or restart of the workstation which results in unregistration of the workstation from the fast start system. The user may initiate shutdown of the workstation at step 502 or the fast start workstation component of the system may initiate restart of the workstation at step 508. Before shutting down, the workstation may report its shutdown to the fast start system and/or the fast start system may detect the user initiated shutdown of the workstation at step 504. In response to determining that the user initiated shutdown of the workstation, the fast start web server may unregister the workstation from the fast start system at step 506 and continue with the normal shutdown or restart process at step 516.

Returning to step 508, with a restart initiated by the fast start workstation application or component, the fast start workstation component may determine whether the fast start system is available at step 510. If the workstation component determines at step 510 that the fast start system is not available, the workstation may proceed to step 512. The fast start system may be unavailable due to being taken down or deactivated for maintenance or the fast start system may be applying software patches to workstations. At step 512, a restart timer is started and upon expiration of the timer the fast start workstation component may again initiate restarting of the workstation. The timer may be, for example, for 15 minutes, 30 minutes, etc. Once the workstation determines the system is available at step 510, the workstation can report the successful restart of the workstation at step 514. The fast start network server can proceed with unregistering the workstation at step 506.

FIG. 6 illustrates an example administration console or interface 600. Using the administration interface 600, a user can configure workstations in the system to enable or disable fast start on the workstations. The user can use the interface 600 to access information on the statuses of various workstations in the system stored in fast start database 310. In the example shown in FIG. 6, a list of workstations is shown including the user name of the user for which the workstation is enabled for fast start, the machine name of the workstation, the internet protocol (IP) address of the workstation, whether the previous fast start attempt was successful or failed, whether fast start is enabled on the machine, and the time that the status of the workstation was last updated.

The user can select a machine on the list of workstations to view details related to the selected workstation which may include messages received by the fast start network server 308 from the workstation and stored in the fast start database 310. The messages may be status log messages such as messages indicating that the machine is rebooting, registered, unregistered, prompting user for autologon information, and/or successful initialization of startup applications. Each message in the log may have a timestamp (e.g., date and time) on which the event reported in the message occurred.

The fast start administrator server 314 may generate various types of reports of the statuses of the workstations based on data stored in fast start database 310. For example, the administrator may be able to view graphs showing successful and failed fast start processes for each branch office. The information may also be shown in summary form such as table listing the number of successful and failed fast starts at each branch. Similarly, information showing the percentage of successful and failed fast starts at each branch office may be overlaid on a map. An unusually high percentage or number of failed fast starts at a particular branch office may indicate a branch-level failure. Other reports may include reports of which workstations and the number of workstations which have not yet checked-in or reported in within a particular time frame and reports of workstations that were disabled and/or enabled each day.

Figure 7:
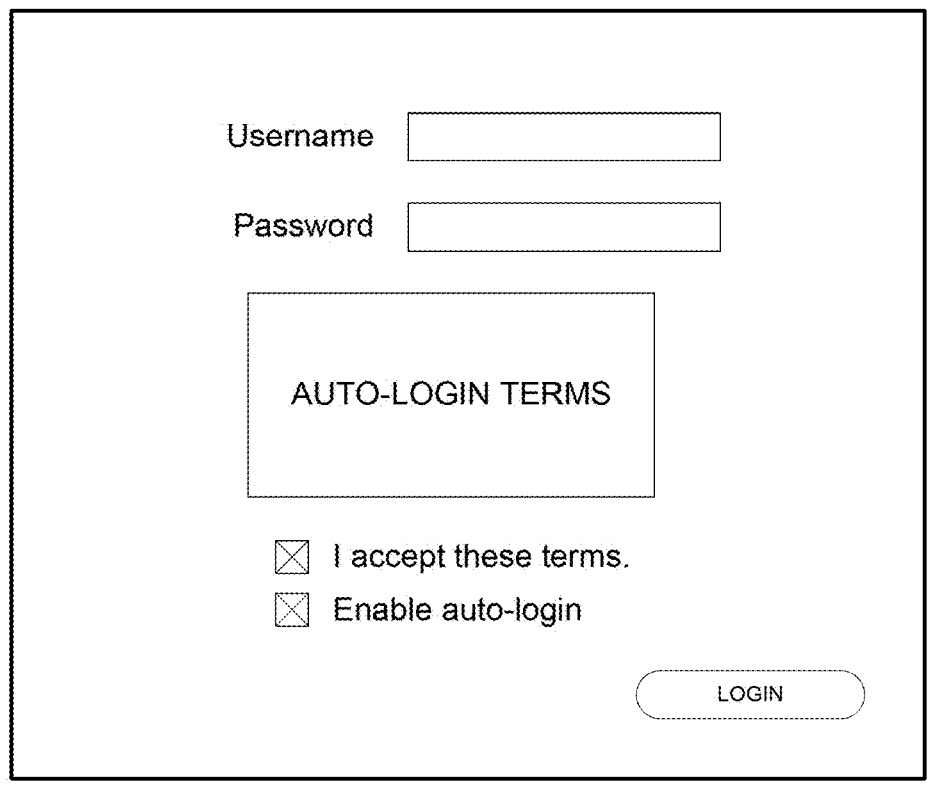
FIG. 7 shows an illustrative login interface according to one or more aspects described herein.

FIG. 7 shows an example integrated login and fast start enable screen. The user can both login and enable the fast start process through this screen by entering the user's username and password. As described herein, the fast start application can capture and securely store the username and password entered on the login screen for automatically logging the user in when the workstation is restarted by the fast start application.

The fast start system described herein enables the restarting and workstation logging in process to be distributed or staggered over a period of time while collecting beneficial workstation status and diagnostic information. On a workstation enabled to use fast start, the user can immediately login upon arriving at the office and be productive because the user's needed applications have been started and fully loaded before the user arrives. In other words, the fast start system eliminates the need for the user to login and wait for the computer to boot up and load necessary applications and distributes the login load on the login servers over a period of time. Moreover, because the fast start system causes the restart of the workstation before each workday begins the workstations may be more stable and run more smoothly.

Various aspects described herein may be embodied as a method, an apparatus, or as one or more computer-readable media storing computer-executable instructions. Accordingly, those aspects may take the form of an entirely hardware embodiment, an entirely software embodiment, or an embodiment combining software and hardware aspects. Any and/or all of the method steps described herein may be embodied in computer-executable instructions stored on a computer-readable medium, such as a non-transitory computer readable medium. Additionally or alternatively, any and/or all of the method steps described herein may be embodied in computer-readable instructions stored in the memory of an apparatus that includes one or more processors, such that the apparatus is caused to perform such method steps when the one or more processors execute the computer-readable instructions. In addition, various signals representing data or events as described herein may be transferred between a source and a destination in the form of light and/or electromagnetic waves traveling through signal-conducting media such as metal wires, optical fibers, and/or wireless transmission media (e.g., air and/or space).

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one of ordinary skill in the art will appreciate that the steps illustrated in the illustrative figures may be performed in other than the recited order, and that one or more steps illustrated may be optional in accordance with aspects of the disclosure. Further, one or more aspects described with respect to one figure or arrangement may be used in conjunction with other aspects associated with another figure or portion of the description.

What is claimed is:

1. A method, comprising:
automatically restarting, by a first computing device, the first computing device at a first time based on a restart schedule particular to a location of the first computing device and a time zone of the location of the first computing device;
initiating a booting sequence of the first computing device;
retrieving stored login credentials of a user;
automatically logging in the user using the stored login credentials;
initializing at least one startup application on the first computing device;
locking the first computing device to the user; and
automatically restarting, by a second computing device, the second computing device at a second time based on the restart schedule, the second time being the first time plus a randomly selected time interval.

2. The method of claim 1, further comprising:
determining whether the user is authorized based on the login credentials.

3. The method of claim 2, wherein initializing at least one startup application on the first computing device, comprises:
in response to determining that the user is authorized based on the login credentials, initializing the at least one startup application.

4. The method of claim 2, further comprising:
in response to determining that the user is not authorized based on the login credentials, prompting the user to manually input login credentials.

5. The method of claim 1, further comprising:
in response to determining that the user is authorized based on the login credentials, starting a reboot timer.

6. The method of claim 1, further comprising:
in response to successfully logging in the user, transmitting a message to a remote computing device.

7. The method of claim 1, further comprising:
receiving the restart schedule from a remote server.

8. A system, comprising:
at least one processor; and
a memory storing computer-readable instructions that, when executed by the at least one processor, cause the system to:
automatically restart a first computing device at a first time based on a restart schedule particular to a location of the first computing device and a time zone of the location of the first computing device;
initiate a booting sequence of the first computing device;
retrieve stored login credentials of a user;
automatically log in a user using the stored login credentials;
initialize at least one startup application on the first computing device;
lock the first computing device to the user; and
automatically restart a second computing device at a second time based on the restart schedule, the second time being the first time plus a randomly selected time interval.

9. The system of claim 8, wherein the memory further stores computer-readable instructions that, when executed by the at least one processor, cause the system to:
determine whether the user is authorized based on the login credentials.

10. The system of claim 9, wherein initializing at least one startup application on the system, comprises:
in response to determining that the user is authorized based on the login credentials, initialize the at least one startup application.

11. The system of claim 9, wherein the memory further stores computer-readable instructions that, when executed by the at least one processor, cause the system to:
   in response to determining that the user is not authorized based on the login credentials, prompt the user to manually input login credentials.

12. The system of claim 8, wherein the memory further stores computer-readable instructions that, when executed by the at least one processor, cause the system to:
   in response to determining that the user is authorized based on the login credentials, start a reboot timer.

13. The system of claim 8, wherein the memory further stores computer-readable instructions that, when executed by the at least one processor, cause the system to:
   in response to successfully logging in the user, transmit a message to a remote computing device.

14. The system of claim 8, wherein the memory further stores computer-readable instructions that, when executed by the at least one processor, cause the system to:
   receive the restart schedule from a remote server.

15. One or more non-transitory computer-readable media having computer-executable instructions stored thereon that, when executed, cause at least one computing device to:
   automatically restart, by a first computing device, the first computing device at a first time based on a restart schedule particular to a location of the first computing device and a time zone of the location of the first computing device;
   initiate a booting sequence of the first computing device;
   retrieve stored login credentials of a user;
   automatically log in a user using the stored login credentials;
   initialize at least one startup application on the first computing device;
   lock the first computing device to the user; and
   automatically restart, by a second computing device, the second computing device at a second time based on the restart schedule, the second time being the first time plus a randomly selected time interval.

16. The one or more non-transitory computer-readable media of claim 15, further including instructions that, when executed, cause the at least one computing device to:
   determine whether the user is authorized based on the login credentials.

17. The one or more non-transitory computer-readable media of claim 16, further including instructions that, when executed, cause the at least one computing device to:
   in response to determining that the user is not authorized based on the login credentials, prompt the user to manually input login credentials.

18. The one or more non-transitory computer-readable media of claim 16, further including instructions that, when executed, cause the at least one computing device to:
   in response to determining that the user is authorized based on the login credentials, start a reboot timer.

19. The one or more non-transitory computer-readable media of claim 15, further including instructions that, when executed, cause the at least one computing device to:
   in response to successfully logging in the user, transmit a message to a remote computing device.

20. The one or more non-transitory computer-readable media of claim 15, further including instructions that, when executed, cause the at least one computing device to:
   receive the restart schedule from a remote server.

\* \* \* \* \*